Figure 1:
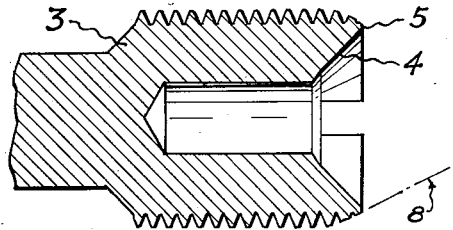

Oct. 19, 1943.   H. D. STECHER   2,332,354
TUBE COUPLING AND METHOD OF MAKING SAME
Filed Oct. 3, 1941   2 Sheets-Sheet 1

INVENTOR.
HENRY D. STECHER
BY
ATTORNEYS

Oct. 19, 1943.    H. D. STECHER    2,332,354
TUBE COUPLING AND METHOD OF MAKING SAME
Filed Oct. 3, 1941    2 Sheets-Sheet 2

INVENTOR.
HENRY D. STECHER
BY
ATTORNEYS

Patented Oct. 19, 1943

2,332,354

UNITED STATES PATENT OFFICE 2,332,354

TUBE COUPLING AND METHOD OF MAKING SAME

Henry D. Stecher, Lakewood, Ohio, assignor to The Weatherhead Company, Cleveland, Ohio, a corporation of Ohio Application October 3, 1941, Serial No. 413,489

2 Claims. (Cl. 29—148.2)

This invention relates to improvements in tube couplings of the type illustrated in the Weatherhead Patent No. 1,733,925 issued October 29, 1929, and to improvements in the method of making couplings of that type. Illustrative prior methods with respect to which this invention is an improvement are disclosed in U. S. Patents Nos. 1,839,909 and 1,905,665. The problems to which my invention is particularly addressed are those arising in the attempted manufacture of tube couplings of the above type when materials difficult to machine are sought to be employed. When materials such as steel, Monel metal, Tobin bronze and the like are sought to be used in such couplings, the advantages of strength, economy and other specific utility of such materials are often substantially, if not wholly, offset by the added cost and other difficulties encountered in the manufacture thereof.

One critical phase of the problem lies in forming the internal threads of the female member adjacent the conical seat provided therein which, as is well known in the art, receives the flared end of the tubular member to be held and gripped in the coupling. The prior art processes, particularly when used with materials which are easily machined and/or threaded, permit the efficient and economic use of taps which are rather abruptly chamfered and are recessed at their leading end to accommodate the conical part of the female member when the leading end of the tap is cutting the threads radially adjacent thereto. Such a recess in the end of a tap weakens it materially with the result that tap failures and related costs approach an excessive if not prohibitive amount in the manufacture of couplings made of materials having difficult machining characteristics. The use of a plurality of taps of progressively less chamfer in successive tapping operations has been resorted to with accompanying expense and with the hazard of spoiling the threads. The prior art has turned to other expedients such as entirely omitting threads on the inner walls of the female member adjacent the cone, but this procedure brings with it a concomitant increase in the length of each of the two coacting coupling members. The prior art has also suggested that the pitch diameter of the threads could be materially increased relative to the base diameter of the cone to permit a stronger support for the cutting elements of the recessed taps where the recess in the end of the tap could be maintained of small diameter compared with the pitch diameter of the tap. This expedient concomitantly increases the whole diameter of both coupling members with relation to the diameter of the tube to be coupled, and it in turn is wasteful of material and costly not only in added material, but also in the increased machine work on larger areas and peripheries.

It is among the objects of my invention to provide a coupling of the inverted seat type of more compact and economical form than has heretofore been obtainable particularly from materials characterized by their relative lack of easy machining characteristics. Other objects are to provide a method of making such couplings; to provide such couplings at low cost when made of such materials as Monel metal, Tobin bronze or the like; to provide cheaper couplings by virtue of using cheaper material such as steel in the face of its more difficult machining characteristics as compared with the same general type of couplings heretofore made in brass or other materials less difficult to machine, and to provide a coupling and method of making the same of great strength and compactness with great speed and economy of manufacture.

Other objects and advantages will appear in the following description of a preferred and certain modified forms of my invention herein illustrated and described with reference to the accompanying drawings. The essential characteristics are summarized in the claims.

Figure 2:
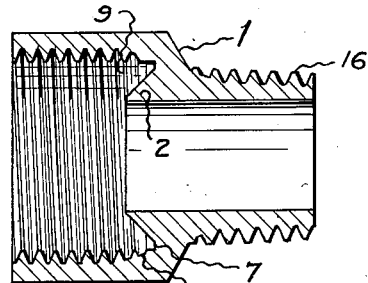
Figure 3:
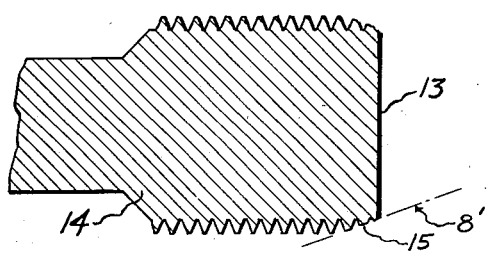
Figure 4:
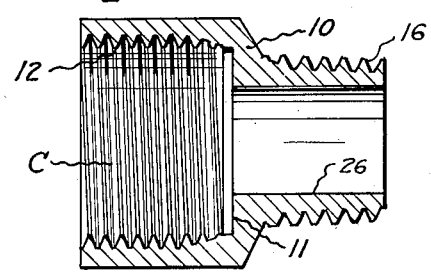
Figure 5:
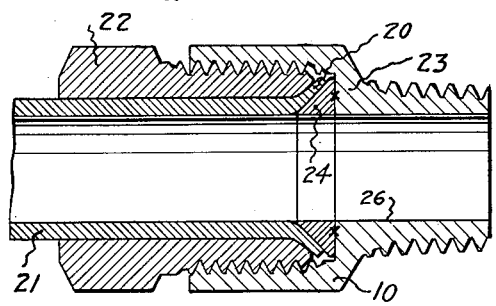
Figure 6:
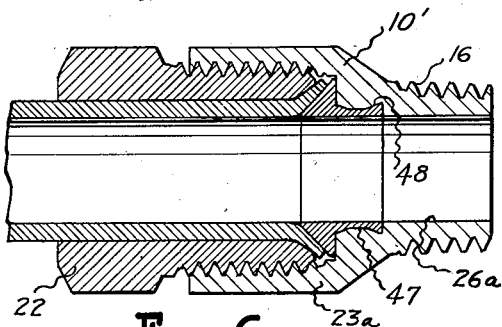
Figure 7:
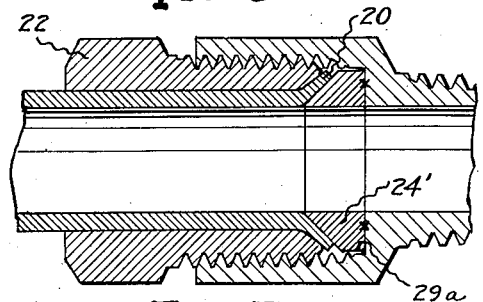
Figure 8:
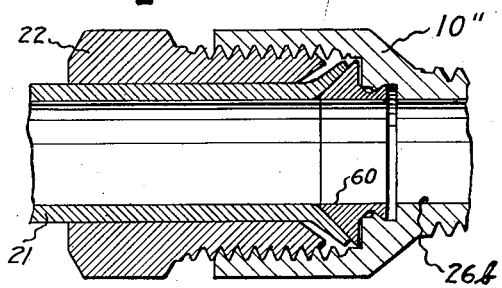
Figure 9:
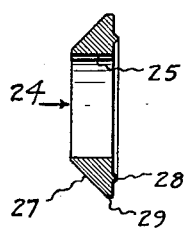
Figure 10:
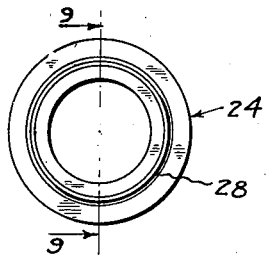
Figure 11:
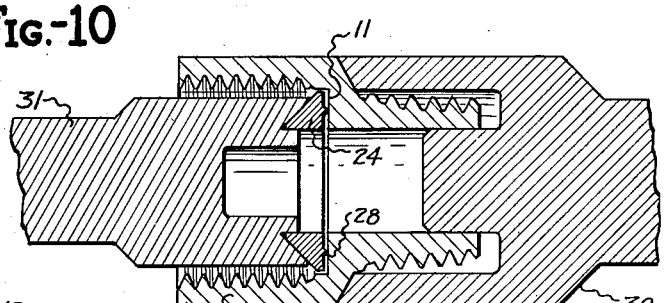
Figure 12:
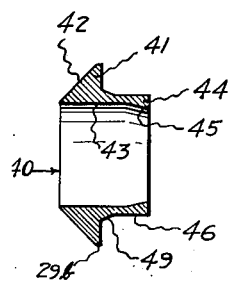
Figure 13:
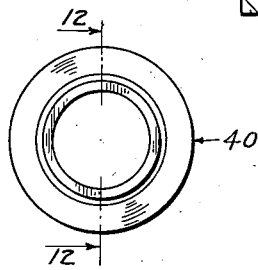
Figure 14:
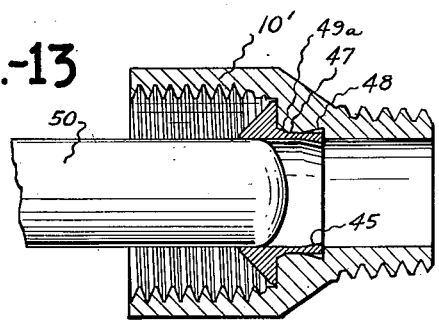
Figure 15:
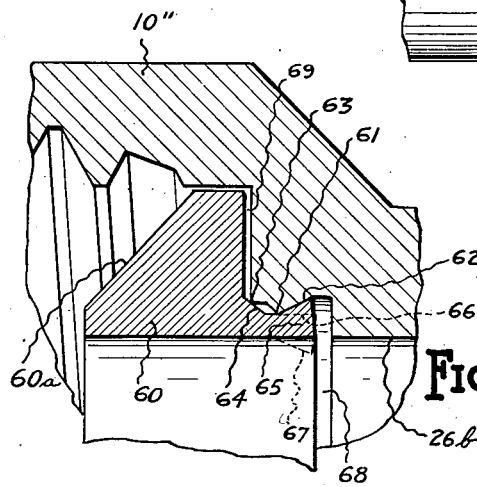

In the drawings Figure 1 is a section of a hollow tap with recessed end; Figure 2 is a section of a prior art form of female body threaded with the tap of Figure 1; Figure 3 is a section of a full bodied tap useful with my invention; Figure 4 is a section of a female body tapped with the tap of Figure 3; Figure 5 is a section of a complete assembled coupling made in one form of my invention; Figure 6 is a similar view of a complete assembled coupling made in another form of my invention; Figure 7 is a similar view of a form modified particularly with reference to Figure 5; Figure 8 is a similar view but taken prior to complete assembly and showing a modification particularly of the form of Figure 6; Figure 9 is a section of a seat member taken on the line 9—9 of Figure 10; Figure 10 is an end elevation of a separately formed seat member; Figure 11 is an illustrative sectional view of seat and female body member with welding electrodes; Figure 12 is section of a seat member taken on the lines 12—12 of Figure 13; Figure 13 is an end of the view of the type of seat used in Figure 6 prior to its displacement into seated position; Figure 14 illustrates a step of seating the seat of Figures 12 and 13 into the female body of Figure 6; Figure 15 is an enlarged sectional view showing a detail of the assembly of Figure 8.

According to prior practices particularly applicable to free-machining metals, female coupling members 1, with integrally formed conical seats 2 as shown in Figure 2, have been tapped with hollow and recessed taps 3 shown in Figure 1 in which the leading end of the tap has been recessed as at 4. By carrying the recess substantially out to the root diameter of the threads as at 5 it has been possible to form the leading at least partial threads substantially all the way down to the base of the conical seat as at 6, i. e., to within about one half to a whole pitch of one thread from the bottom. In practice, however, enough stock has to be preserved at the point 5 in the tap to support the leading cutters, and correspondingly a flat annular area of somewhat greater size as at 7 has been required to be formed in base at the threaded cavity adjacent the base of the conical seat in the finished coupling. Some if not all of the radial dimension of this area represents waste in the form of increased pitch diameter of the threads and increased diameter of the body of the coupling beyond the minimum that would be sufficient for strength particularly in steel and other stronger though less freely-machined metals. However, with the "tougher" metals the inherent weakness in the tap construction of Figure 1 is merely emphasized to the point of relative impracticability.

With free-machining metals the chamfer 8 on the nose of the recessed tap may be kept fairly steep (from about 45° to 60° included angle), reducing the number of partially formed threads 9 adjacent the seat in the finished coupling. This factor is limited by the recess 4 in the tap since the load on the leading cutters must be limited with regard to the lack of supporting structure at the leading end of the tap. Here again the impracticability of the use of "tougher" metals under the prior practice is critical since increasing the chamfer (making it flatter) to reduce the load on the leading cutters, also reduces the total effective thread area and militates against the other potential savings and advantages.

According to the practice of my invention I first form the body of a female member 10, see Figure 4, in the same general way as has been the practice indicated in the patents mentioned above with the major difference, however, that the wall 11 at the base of the cavity C, is preferably made radially smooth and devoid of the integrally formed conical seat 2 shown in Figure 2. By making this surface 11 substantially radially flat as shown, I am enabled to use a much more rugged tap as shown in Figure 3 in performing the tapping operation to form the internal threads in the cavity C. As shown in Figure 3, the leading face 13 of the tap 14 may be substantially full and square whereby to give stout support for the leading cutters 15. In this way these cutters may be so supported as to facilitate forming the threads 12 in a single tapping operation, tapping substantially all the way to the bottom of the cavity (to within about one half the pitch of a thread from the bottom) in one operation, and employing a tap in which the chamfer 8' may be similar to or at least not greatly less than the chamfer employed with the free-machining metals. I prefer to employ an included angle of chamfer of about 30° to 45° included angle, depending upon the toughness of the material. Compared with an included angle of chamfer employed with the taps used with free-machining materials, the difference in the greater number of partially formed threads in the members threaded with the more chamfered taps is substantially offset by the greater strength of all the threads in the tougher metals, and also by other advantages in the practice of my invention.

Within my method of making a coupling, I first form the body of the female member by appropriate drilling and counterboring operations and the subsequent tapping operation mentioned above to bring the piece to the condition substantially as shown in Figure 4. The external pipe threads 16 are merely illustrative of a commonly useful external construction of one end of the member as is well understood in the art. The member so formed is devoid of any conical seat for receiving the flared end 20 of the tube 21 to be coupled between the male member 22 and the complete female member 23, see Figure 5.

To provide a conical seat for receiving the flared end of the tube, I prefer to form this seat member 24 in the form of an annulus having an internal cylindrical aperture 25 corresponding in diameter to the main bore 26 of the female member, and having an outer conical surface 27 formed, preferably at about 45°, to receive the flared end of the tube as shown in Figure 5. Preferably the seat member 24 also has on the radial face thereof a raised preferably sharp edged ring 28 formed to localize welding currents whereby the same may be spot-welded to the seat surface 11 as shown in Figure 11. I prefer that the outer annular edge 29 of the member 24 comprise a narrow cylindrical surface the width of which may be selectively varied as hereinafter shown.

In Figure 11 I have shown more or less diagrammatically the partially formed female member 10 supported and centered in an electrode 30, and the conical seat member 24 supported in an oppositely directed electrode 31 with the sharp edged ring 28 contacting the radial surface 11 and the other edges and other parts and surfaces of the seat member 24 out of contact with adjacent parts of the female body member 10. With the parts positioned as shown in Figure 11 and the internal bores of the members held in alignment by the electrodes, the parts are preferably spot-welded together under appropriate mechanical pressure exerted by the electrodes toward each other and with appropriate electrical conditions for a period of time sufficient to weld the parts together as is well understood in the welding art. In this construction it is preferred that the annular ridge 28 be formed on the seat 24 rather than on the surface 11. In either event the purpose is to obtain even distribution and concentration of the welding current to insure a uniform weld and a good mechanical and fluid tight union between the parts. While I prefer to spot-weld the seat to the female body as described I also contemplate that the separately formed seat may under some condition be advantageously secured in the female body by induction or resistance welding heat and/or by so-called silver soldering or other equivalent steps or means. My purpose being in this respect to tap the body in the absence of the seat and thereafter to insert and secure the seat within the body and hold the same in fluid-tight relation thereto at least when the flared end of the tube is grasped and held between the male and female members.

The particular form of seat shown in Figures 9 and 11 when secured as by welding to the body 10 of the female member 23 is shown in Figure 5 in working relation with the tube to be coupled and the coacting male member 22. It will be seen in Figure 5 that with the seat 24 in the form shown, the extreme inner end of the male member may have begun to enter the partially formed threads in the female member which are not fully cut as by the chamfered cutters 15 on the end of the tap 14. In this form I prefer to chamfer the nose of the male member as much as necessary in much the manner taught in the Weatherhead Patent No. 1,733,925 but to a lesser extent since the seat 24 is preferably proportioned to prevent complete entry of the end of the male member into the partially threaded zone of the female member.

In Figure 7 I have shown a modified form of seat member 24' differing only from the member 24 particularly shown in Figures 5, 9 and 10 in that it is of somewhat greater thickness having an outer elongated cylindrical wall 29a which lies radially opposite substantially all the partially formed threads at the extreme bottom of the threaded cavity C of the female member. In this construction the seat member 24' in conjunction with the flared end 20 of the coupled tube, even when the latter is greatly compressed by the forcible entry of the male member 22, may serve to wholly exclude the foremost end of the male member from the zone of less than full depth threads in the female member. In this way the threads on the entering end of the male member need not be chamfered, except perhaps to facilitate the original threaded entry of one member into the other, with the result that full depth threads may be used throughout the length of the male member coacting with full depth threads in the female member, whereby to develop the maximum threaded strength in both members in a minimum over-all length of complete coupling and with minimum pitch diameter of threads and consequent minimum external diameters of the coupling members. Thus I am able to take full advantage of the greater strength of the "tougher" and stronger materials and use smaller fittings (for a given size tube), reducing the size in inverse proportion to the increased strength of the material employed, all without costly deference to the exigencies of tapping in the presence of the preformed prior art seat of Figure 2.

In both the forms shown in Figures 5 and 7 the inserted seat members are preferably proportioned as above described to partially or wholly exclude the inner end of the male member from substantial entry into the partially cut threads at the base of the female cavity, albeit in the practice of my invention I may, as by reducing somewhat the base diameter of the conical part and/or the longitudinal thickness of the seat member 24 relative to the tap drill diameter of the cavity C, permit the male member to enter the female member more deeply and engage as much or little of the incompletely cut threads in the base of the cavity of the female member as desired, for example to the full extent shown in the Weatherhead Patent No. 1,733,925. One of the advantages of my method of making couplings is the facility with which this geometrical relationship between the parts may be altered and selected without being limited by the exigencies of the tapping operation for cutting the threads 12 in the presence of the integrally formed seat, as has been the common practice in the prior art. Moreover the most advantageous and economical pitch diameter may be chosen for the threads consistent with the strength of the material selected and the inherent strength of the parts may be developed with consequent saving in weight, size and mass of the coupling.

As alternative methods of securing a separately formed conical seat within the body of the female member after it has been tapped, I have shown certain other forms of separately insertable seats as in Figures 6, 8, 12, 13, 14 and 15. In these modified methods the major steps are similar to those above described in that the body 10' of the female member will be formed and threaded as above described, except that the central bore 26a thereof, Figure 6, and 26b, Figure 8, will be counterbored to receive longitudinal extensions of the seat member to be inserted and secured therein.

The seat member 40 shown particularly in Figures 6, 12, 13, and 14 comprises an annular body portion 41 having an external conical surface 42 similar to the surface 27 in the member 24 adapted to receive the flared end 20 of the coupled tube 21 and has an internal cylindrical bore 43 corresponding to and axially aligned with the bore 26a of the female member. The outer cylindrical surface 29b has the characteristics of the surface 29 or 29a as desired. The seat member 40 has a longitudinal annular extension 44 formed in the first instance with an internally tapered surface 45 extending for a limited length and merging with the inner cylindrical bore 43. The extension 44 also has an external cylindrical surface 46 of substantially the same diameter as the main counterbore 47 in the body 10', see Figure 14. The counterbore 47, however, has an annular under-cut portion 48 substantially corresponding in volume to the volume of the extreme end of the extension 44, which includes the tapered surface 45. To assemble the seat member 40 into the body 10', the parts are placed or pressed in the position shown in Figure 14, and thereupon by the action of a swedging tool 50 acting longitudinally, as for example in a punch press, or by an appropriate spinning operation, the surface 45 is pressed outwardly, thereby expanding the end of the extension 44 into the under-cut portion 48 of the counterbore 47 to secure the parts in the assembled relation shown in Figure 6. Preferably the exterior wall of the extension 44 adjacent the body 41 is bevelled slightly as at 49 to correspond with a complementary bevelled portion 49a in the counterbore 47 of the body 10' to insure a fluid tight joint between the parts. The geometrical relation of the conical surface 42 to the threaded cavity of the female member may be the same as the corresponding surface of the member 24, as shown in Figure 5, or, by the variation described with reference to the forms shown in Figures 5 and 7, may be raised more or less from the base of the cavity for the purposes and with the advantages above discussed. The complete female member designated 23a in Figure 6, comprising the inserted conical seat 40 in the body 10', will coact with the flared end of the tube and complementary male member 22 in the same manner as that above described. The threaded relationship between the male and female members may be selected with the same facility and advantages above discussed.

In Figures 8 and 15 the seat 60 is shown in secured though perhaps not fully seated relation to the female body 10". Here the bore 26b of the body 10" joins the threaded cavity C in a counterbore 61, undercut as at 62 and having a sharp annular edge 63 at the intersection of the counterbore with the bottom of the cavity C. The seat 60 has a main conical tube receiving surface 60a and a minor conical surface 64 juxtaposed to the edge 63 and bearing thereupon in response to axial forces which tend to crush the edge 63 and perhaps score the surface 64, whereby to form a fluid tight joint particularly when the male and female coupling members are gripping the flared end of the tube and thereby forcing the seat axially to the right as shown in Figures 8 and 15. The seat 60 also has an annular extension 65 which in the first instance has a cylindrical external surface comprising in part the portion shown in dotted lines at 66, along with an inwardly tapered end shown in dotted lines at 67. When the seat 60 is first positioned in the body 10", it bottoms on contact between the surface 64 and the edge 63. Thereafter by the application of an expanding tool similar to the tool 50 of Figure 14, the tapered end 67 of the extension 65 is expanded outwardly into a fairly snug fit with the undercut part 62 of the counterbore 61, leaving a space between the end of the extension and the bottom of the counterbore. In this step the seal 63—64 is developed or begun to be developed and the seat 60 is mechanically locked within the body 10". Similarly the bottom of the seat is spaced from the bottom of the cavity C as at 69 to permit further movement between the seat 60 and body 10" to develop a tight or tighter seal between the surface 64 and the edge 63. The parts are thus in the position shown in Figures 8 and 15.

When the male member 22, see Figure 8, enters the body 10" with the tube 21 and seat 60 in the position shown, the flared end of the tube is forced onto the seat and the seat is in turn forced axially to the right developing the seal 63—64 above described. The seat is only held against movement in the first instance by the initial engagement between the expanded end 67 and the undercut of the counterbore. This force, however, does not resist further axial movement to the right as shown in Figures 8 and 15, and thus the seat may move to the right, rotate with the tube or tip more or less as the male member is screwed home in the female member, all to the end of perfecting the seal between the body 10" and seat 60 as well as between the flared end of the tube and the conical tube seating surface 60a of the seat. The spaces 68 and 69 permit repeated seatings or reseatings and repeated use of the coupling with the same or different tubes. The seat is retained generally in place in the bottom of the cavity of the female body by the expanded end 67 in the undercut of the bore, and the ability of the seat to rotate with the tube is often of advantage to prevent scoring of the flared end of the tube by or as induced by the turning motion of the male member relative to the female member. While it is desirable to secure the seat members into the body of the female member in the manner shown in Figures 6 and 8, where the materials employed are not readily weldable, I do not mean to exclude from my teaching the use of these forms of my coupling or these forms of my method when employing materials which have acceptable welding or brazing characteristics. While I have referred generally to materials having difficult machining characteristics and so-called tougher and stronger materials particularly in connection with female body parts of the coupling, it will be understood that my invention is susceptible of advantageous practice with other materials and with two or more kinds of materials employed in different parts of the coupling.

While I have illustrated and described preferred and certain modified forms of my method and apparatus inventions, changes and modifications therein will occur to those skilled in the art without departing from the spirit thereof, and I do not care to be limited to the precise forms herein illustrated and described or in any manner other than by the claims appended hereto when construed with the range of equivalents to which they are entitled in view of my advance from the state of the prior art.

I claim:

1. The method of making the female body of a coupling of the inverted seat type which consists in drilling and counterboring the body to form a cavity bottoming in a medial shoulder, tapping the counterbored cavity substantially to said shoulder in a single operation with threads of progressively decreasing depth immediately adjacent said shoulder and of uniform depth from a point spaced from said shoulder to the open end of said counterbored cavity, inserting a conical seat member into the said counterbore, spacing said seat member in welding relationship to said counterbored cavity and said shoulder, and then welding the same into fluid tight relation to said shoulder with the conical part of said seat member overlying at least the shallowest of said threads in said cavity.

2. A flared tube coupling comprising a female member having an internally threaded cavity in which certain of the threads adjacent the base thereof are but partially formed as by a chamfered tap and having a separately formed conical seat secured in the base of said cavity in fluid-tight relation therewith with its conical surface having its greatest diameter substantially equal to the minor diameter of the threads of said cavity and adapted to receive the flared end of a tube to be coupled and positioning said flared tube end longitudinally spaced from at least the least formed of said partially formed threads, and an externally threaded male member having an internal conical surface at its forward end adapted to engage the flared end of the tube.

HENRY D. STECHER.